United States Patent [19]

Kowalski

[11] Patent Number: 4,460,299

[45] Date of Patent: * Jul. 17, 1984

[54] FASTENER

[75] Inventor: Joseph W. Kowalski, Florissant, Mo.

[73] Assignee: B-Line Systems, Inc., Highland, Ill.

[*] Notice: The portion of the term of this patent subsequent to Aug. 25, 1998 has been disclaimed.

[21] Appl. No.: 356,245

[22] Filed: Mar. 8, 1982

Related U.S. Application Data

[63] Continuation-in-part of Ser. No. 330,191, Dec. 14, 1981, abandoned.

[51] Int. Cl.³ .............................................. F16B 39/00
[52] U.S. Cl. ........................................ 411/85; 411/104
[58] Field of Search ................... 411/109, 84, 85, 103, 411/104, 112, 119, 120, 121, 123

[56] References Cited

U.S. PATENT DOCUMENTS

| | | | |
|---|---|---|---|
| 1,306,100 | 6/1919 | Chadwick. | |
| 1,411,720 | 4/1922 | Goodie | 411/120 |
| 2,633,174 | 3/1953 | Poupitch | 411/112 |
| 3,483,910 | 12/1969 | Londe et al. | 151/41.75 |
| 4,146,074 | 3/1979 | Kowalski | 151/41.75 |
| 4,285,379 | 8/1981 | Kowalski | 411/85 |

FOREIGN PATENT DOCUMENTS 513368 of 1938 United Kingdom.
1061149 9/1963 United Kingdom.

Primary Examiner—Gary L. Smith
Assistant Examiner—Lloyd A. Gall
Attorney, Agent, or Firm—Senniger, Powers, Leavitt and Roedel

[57] ABSTRACT

A fastener for securing parts to channel framing having side flanges with inwardly turned, hook-shaped lips defining a slot therebetween. The fastener comprises an elongate body or nut having inside and outside faces, opposite sides and opposite ends, a width less than that of the slot and a length greater than the width of the slot. The fastener also includes a clamp member carried on the outside face of the nut for engaging the outside faces of the channel lips, and guide members extending from the clamp member to a position beyond the inside face of the nut. At least one of the guide members has a portion bent to provide a spring finger receivable in a recess in the inside face of the nut to hold the clamp member in assembly with the nut. The spring finger is also engageable with the nut for providing spring action tending to draw the clamp member in the direction back toward the outside face of the nut thereby to clamp the clamp member and nut against respective outside and inside faces of the channel lips.

10 Claims, 6 Drawing Figures

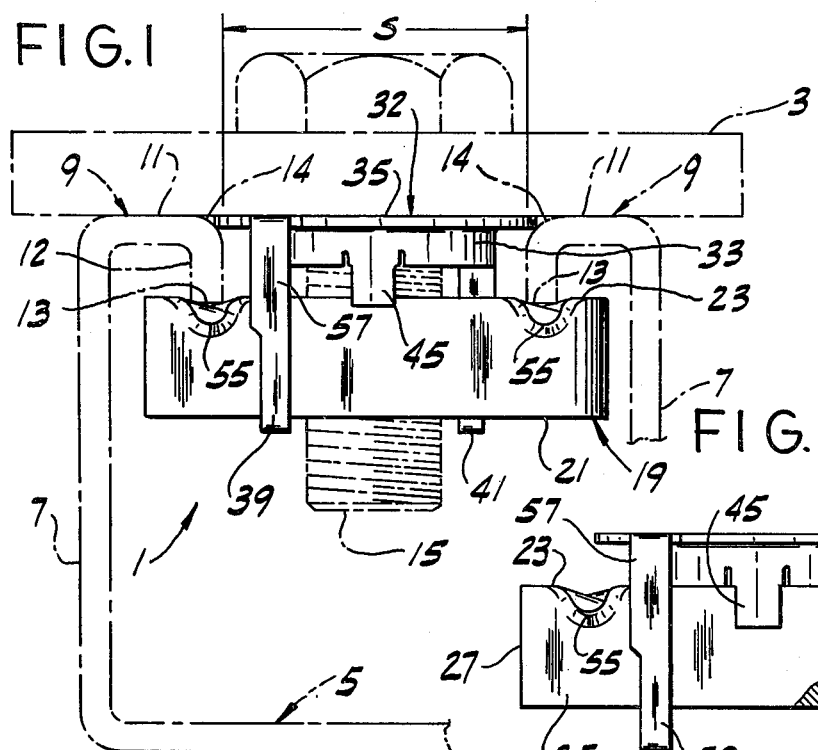

FASTENER

CROSS-REFERENCE TO RELATED APPLICATION

This is a continuation-in-part of my co-assigned pending U.S. application Ser. No. 330,191, filed Dec. 14, 1981 now abandoned.

BACKGROUND OF THE INVENTION

This invention relates generally to fasteners for fastening objects to metal channel framing and, more particularly, to a nut having means for clamping the nut to the channel prior to and during securement of the objects to the channel.

Electrical conduit, pipes, fixtures, etc. are commonly supported overhead or vertically by channel framing conventionally having side flanges with inwardly turned, hook-shaped lips defining a slot therebetween. Typically, an elongate nut (narrower but longer than the width of the slot) is used for securing objects to the framing, the nut first being aligned with, entered into and passed through the slot, and then turned 90° to a crosswise position with the outside face of the nut engaging the inside faces of the channel lips. Various means have heretofore been used for holding the nut against the channel in its crosswise position prior to and during securement of an object to the channel.

One such means is a coil compression spring on the inside face of the nut. Upon insertion of the nut into the channel, this spring reacts from the channel bottom and pushes the nut against the channel lips. This arrangement has several serious disadvantages, however, one being that each channel of different depth requires a spring of correspondingly different length, thus greatly increasing the number of fastener sizes which have to be stocked. Moreover, while securing parts to the framing, the nuts tend to tilt and topple over into the channel. It is also difficult to use the channel as a raceway for conduit, wires or the like since the spring substantially blocks the entire channel.

The fastener disclosed in my U.S. Pat. No. 4,146,074, issued Mar. 27, 1979, solves the aforementioned problems in that it provides a clear channel for carrying conductors and remains securely in place on the channel prior to and during securement of an object to the channel. However, while the installation and use of this fastener have been entirely satisfactory, its manufacture has required that the sides of the nut be slotted. This, of course, requires a separate machining step (e.g., a broaching step) with its attendant costs. Moreover, it makes fastener more difficult to assemble, thereby increasing labor costs. The fastener disclosed in my U.S. Pat. No. 4,285,379, issued Aug. 25, 1981, eliminates the need to slot the nut by using a retainer plate on the inside face of the nut. While this design has also been generally satisfactory, it has certain drawbacks.

Reference may be made to U.S. Pat. Nos. 1,306,100 and 3,483,910, and British Pat. Nos. 513,368 and 1,061,149, all of which disclose fasteners of the same general type as that of the fastener of this invention.

SUMMARY OF THE INVENTION

Among the several objects of this invention may be noted the provision of a fastener which is readily installed on a channel and self-retaining thereafter; the provision of such a fastener which remains securely in place on the channel prior to and during securement of an object to the channel; the provision of such a fastener which provides a clear channel for carrying an increased number of conductors; the provision of such a fastener which fits channels of all depths, thus reducing the number of fastener sizes which need to be stocked; and the provision of such a fastener which is economical to produce and easy to assemble.

Generally, an improved fastener of this invention, which is useful for securing a part to metal framing having a slot and inside and outside faces on opposite sides of the slot, comprises an elongate body having an inside and an outside face, opposite sides and opposite ends. The width of the body is less than that of the slot in the framing whereby the body may be generally aligned with the slot, entered into the slot and passed through the slot from the outside to the inside of the framing and then turned to extend in crosswise position for engagement of portions of the outside face of the body adjacent the ends of the body with the inside face of the framing at opposite sides of the slot. The body has a hole through it extending from the outside to the inside face of the body for threadably receiving a bolt or the like, and a recess in the inside face of the body. The fastener also includes means for clamping the body in place in the aforesaid crosswise position comprising a clamp member carried by the body on the outside face thereof for engagement with the outside face of the framing on opposite sides of the slot when the body is generally aligned with and entered into and passed through the slot and also when the body is turned to its crosswise position. The clamping means further comprise retaining means for holding the clamp member in assembly with the body while permitting movement of the clamp member relative to the body between an extended position in which the clamp member is spaced away from the outside face of the body and a retracted position wherein the clamp member is more closely adjacent the outside face of the body. The retaining means comprises guide members extending from the clamp member on opposite sides of the body having a length greater than the thickness of the body and projecting inwardly beyond the inside face of the body. At least one of the guide members has a portion bent to provide spring finger means engageable with the inside face of the body for providing a spring action tending to draw the clamp member back toward the outside face of the body for clamping the body and clamp member against the inside and outside faces of the framing on opposite sides of the slot. The spring finger is receivable in the recess in the inside face of the body or holding the clamp member in assembly with the body.

Other objects and features will be in part apparent and in part pointed out hereinafter.

BRIEF DESCRIPTION OF THE DRAWINGS

FIG. 1 is an elevation of a part secured to a channel frame by means of a fastener of this invention;

FIG. 2 is a side elevation of the fastener of FIG. 1 showing it removed from the channel;

FIG. 3 is a left end elevation of the fastener of FIG. 2;

FIG. 4 is a top plan of the fastener shown in FIG. 2;

FIG. 5 is a bottom plan of the fastener shown in FIG. 2; and

FIG. 6 is a view similar to FIG. 2 showing relevant parts of an alternative fastener of the present invention.

DESCRIPTION OF A PREFERRED EMBODIMENT

Referring now to the drawings, particularly to FIG. 1, a fastener of this invention is indicated in its entirety at 1 and is shown securing a part 3 (such as a bracket) to a metal channel frame or support generally indicated at 5. This channel has a pair of side flanges 7, the outer (upper) ends of which have inwardly directed lips formed thereon as indicated generally at 9. These lips are hook-shaped, each having an outside face with a flat horizontal portion 11, a vertical portion 12 terminating in an inside edge 13, and a curved transition portion 14. The vertical portions 12 of the lips are spaced from one another to define a slot S therebetween which extends the length of the channel. As illustrated, part 3 spans slot S and bears on the horizontal portions 11 of the outside faces of the channel lips at opposite sides of the slot, the part being locked in position by means of a conventional bolt 15 extending through the part and threaded into a tapped hole or bore 17 in fastener 1.

More particularly, the fastener 1 comprises an elongate body or nut generally designated 19 having an inside (lower) face 21, an outside (upper) face 23, opposite sides 25 and opposite ends 27. While the length of nut 19 is greater than the width of channel slot S (but less than the distance between channel side flanges 7), the width of the nut is less than the width of slot S so that the nut may be inserted in and installed on the channel in a manner to be hereinafter described. Diagonally opposite corners of the nut are rounded as indicated at 29 for facilitating such installation. Hole 17 for threadably receiving bolt 15 extends completely through the nut from the outside face 23 to the inside face 21 of the nut. For reasons which become apparent, two recesses, each designated 31, are provided in the inside (lower) face of the nut on opposite sides of hole 17 (see FIG. 5).

Carried by nut 19 on the upper face 23 thereof is an annular clamp member generally designated 32 comprising a ring 33 having a radial flange 35 extending outwardly therefrom for engaging the curved transition portions 14 of the channel lips 9 on opposite sides of slot S. Flange 35 has two diametrically opposed notches 37 therein. For holding the ring 33 in assembly with the nut, retaining means is provided comprising a pair of guide members of arms, each designated 39, bent downwardly from the radial flange 35 adjacent the notches 37. These arms 39 are integrally formed with flange 35 and extend down on opposite sides of the nut generally adjacent opposite ends of the nut. They have a length greater than the thickness of the nut and extend beyond the inside (lower) face of the nut. The lower ends of the arms are bent to form upwardly angled fingers 41 extending on the inside (lower) face of the nut on opposite sides of hole 17. The free ends of the fingers 41 are bent to form vertical finger tips 43 receivable in the two recesses 31 in the lower face of the nut. This prevents the clamp member 33 from sliding along (and possibly off) the nut.

Indicated at 45 is a pair of retaining members constituted by two relatively thin short integral lugs or tabs extending down from ring 33 on opposite sides of the nut adjacent arms 39. The lugs are located directly across from one another generally on the transverse centerline of the nut (i.e., about midway between the ends 27 of the nut) and are engageable with the sides 25 of the nut for preventing all relative rotational and lateral (side-to-side) movement of the clamp member 33 and nut. Thus, lugs 45 operate in conjunction with the tips 43 of fingers 41 to hold the clamping ring 33 in assembly with the nut.

The arms 39 and fingers 41 of the clamping member 33 are of resilient material such as tempered carbon 1060 steel (or plastic) for permitting relative movement of the ring 33 and the nut 19 between and extended position (see FIG. 1) in which the ring 33 is spaced away from the outside face 23 of the nut, and retracted position (see FIG. 2) wherein the ring is more closely adjacent the outside face. With the flanged clamping ring 30 in its FIG. 2 position immediately adjacent the outside face 23 of the nut 19, the fingers 41 are unflexed or relaxed. However, with the fastener clamped onto channel 7 as shown in FIG. 1, the ring 33 is spaced from the outside face 23 of the nut and the fingers are accordingly flexed away from the clamping ring toward the bottom of the channel. In this flexed condition, the fingers tend to force or bieas the nut back toward ring 33 for clamping the nut and ring against respective inside edges 13 and curved portions 14 of the outside faces of the channel lips 9 at opposite sides of slot S. Thus fingers 41 constitute, in effect, spring means. The clamp member 32 may be formed (e.g., stamped) from sheet metal (e.g., 0.024 in. thick sheet steel) or molded as an integral plastic part.

To insure that fastener 1 remains in position (even on a vertical channel) prior to and during the securement of a part to the channel, the inside edges 13 of the channel lips 9 are received in parallel slots 51 extending across the outside face 23 of the nut at opposite sides of the threaded hole 17 toward opposite ends of the nut. These slots have upstanding teeth 53 therein for providing a firm grip between nut 19 and the channel lips. The slots 51 may be formed by a coining operation, in which case protuberances 55 are formed at the ends of each slot due to the displacement of metal. These protuberances project laterally outwardly from opposite sides 25 of the nut. There are four protuberances altogether, two on each side of the nut at the ends of slots 51. The arms 39 of the clamping member extend down from the flange 35 of ring 33 closely adjacent diagonally opposite protuberances 55 on the inside of the latter (i.e., on the side of the protuberances toward the transverse centerline of the nut). Relatively wide portions 57 of arms 39 are engageable with the protuberances to assist in the prevention of substantial lengthwise movement of the clamp member relative to the nut thereby to ensure that the two parts are securely held in assembly.

Inasmuch as the radial flange 35 of the clamp member 33 engages the curved transition portions 14 of the channel lips, the flange lies below the plane tangent to the outer (upper) surfaces of the horizontal portions 11 of the channel lips. Thus, part 3 rests flush against the lips when bolted in position.

To install fastener 1 on channel 5, the nut 19 is aligned with, entered into and passed through slot S from the outside to the inside thereof until the undersurface of the radial flange 35 on ring 33 engages the curved portions 14 of the channel lips 9. The nut is then pushed toward the channel bottom (thus causing the arms 39 to move with respect to the nut and the spring fingers 41 to flex) and rotated a quarter turn to a position in which the nut extends crosswise of slot S, as shown in FIG. 1.

The rounded corners 29 of the nut facilitate rotation of the nut to this crosswise position, further rotation being prevented by the unreduced corners which thus ensure proper alignment of serrated slots 51 with channel edges 13 and assist in holding nut 19 against further turning as bolt 15 is tightened. After the nut has been turned, it is released whereupon the flexed spring fingers 41 pressing against the inside (lower) face of the nut force the outside face 23 of the nut against channel lip edges 13 which are received in slots 51 in the nut as shown in FIG. 1. Fastener 1 may be quickly and easily removed from the channel (as for reuse) by simply reversing the steps as set out above.

FIG. 6 shows an alternative fastener of the present invention which is designated 1a to distinguish it from the fastener 1 shown in FIGS. 1-5. The parts of fastener 1a identical to the parts of fastener 1 are designated by the same reference numerals. The only difference between the two fasteners 1, 1a is that the ring 33 of fastener 1a is not formed with retaining members or lugs comparable to lugs 45 of fastener 1. In the modified fastener 1a, substantially lengthwise and rotational movement of the clamp member 33 relative to the nut is prevented by the relatively tight fit of the finger tips 43 in recesses 31 (the recesses may be 0.10 in. diameter bores, for example, and the finger tips 0.093 in. wide) and by the engagement of the relatively wide portion 57 of arms 39 with diagonally opposite protuberances 55. Relative lateral (side-to-side) movement of the clamp member and nut is substantially prevented by the engagement of arms 39 with the sides of the nut and by the reception of finger tips 43 in recesses 31. The elimination of lugs 45 facilitates assembly of the clamp member and nut.

It will be observed from the foregoing that the fasteners 1, 1a of this invention are readily installed on a channel support and self-retaining thereon after installation. Moreover, the fasteners may be used with a channel of any depth and leave the channel clear of obstruction for freely carrying conductors or the like. It will also be observed that the fasteners are economical to manufacture, especially since there is no need to slot the sides of the nut.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a fastener comprising:

an elongate body having a first face constituting an inside face and an opposite face constituting an outside face, opposite sides, and opposite ends, the width of said body between said sides being less than the width of the slot in the framing whereby the body may be generally aligned with the slot, entered into the slot and passed through the slot from the outside to the inside of the framing and then turned to extend in crosswise pollution relative to the slot for engagement of portions of the outside face of the body adjacent the ends of the body with the inside face of the framing at opposite sides of the slot;

a hole through the body extending from the outside to the inside face of the body for threadably receiving a bolt or the like;

a recess in the inside face of the body;

means for clamping the body in place in its said crosswise position comprising a clamp member carried by the body on the outside face of the body for engagement with the outside face of the framing on opposite sides of the slot when the body is generally aligned with, entered into, and passed through the slot and also when the body is turned to its said crosswise position, and retaining means for holding the clamp member in assembly with the body while permitting movement of the clamp member relative to the body between an extended position in which the clamp member is spaced away from the outside face of the body and a retracted position wherein the clamp member is more closely adjacent the outside face of the body, said retaining means comprising:

guide members extending from the clamp member on opposite sides of the body having a length greater than the thickness of the body and projecting inwardly beyond the inside face of the body, at least one of said guide members having a portion bent to provide spring finger means engageable with the inside face of the body for providing spring action tending to draw the clamp member in the direction back toward the outside face of the body for clampwise engagement of the body and clamp member with portions of the framing on opposite sides of the slot, said spring finger means being receivable in said recess in the inside face of the body for holding the clamp member in assembly with the body; and a pair of retaining members extending from the clamp members on opposite sides of the body, said retaining members being engageable with the side of the body for preventing substantial rotational movement of the clamp member in at least one direction with respect to the body.

2. A fastener as set forth in claim 1 wherein said retaining members are located directly across from one another on opposite sides of the body for engagement with the body to prevent (a) substantial rotational movement of the clamp member in both directions with respect to the body and (b) substantial lateral movement of the clamp member relative to the body.

3. A fastener as set forth in claim 2 wherein said retaining members are located generally on the transverse centerline of the body.

4. A fastener as set forth in claim 3 wherein said clamp member comprises a ring having a radial flange extending outwardly therefrom for engaging the outside face of said framing, said guide members comprising a pair of arms extending from diametrically opposite portions of said flange.

5. A fastener as set forth in claim 4 wherein said retaining members are constituted by integral lugs extending from said ring.

6. A fastener as set forth in claim 5 wherein a pair of protuberances project laterally outwardly from opposite sides of the body at locations toward opposite ends of the body, said arms being engageable with said protuberances for assisting in the prevention of substantial rotational and longitudinal movement of the clamp member relative to the body.

7. A fastener as set forth in claim 6 wherein each arm is disposed immediately adjacent a respective protuberance on the side of the protuberance toward the transverse centerline of the body.

8. A fastener as set forth in claim 7 wherein said spring finger means comprises a finger bent from the inner end of each of said arms, said fingers being engageable with the inside face of the body and being adapted to flex as the clamp member is moved from its retracted toward its extended position.

9. A fastener as set forth in claim 8 wherein the inside face of the body has two recesses therein and wherein the inner ends of said fingers are bent to form finger tips receivable in said recesses.

10. As fastener as set forth in claim 9 wherein said fingers extend on opposite sides of said threaded hole through the body.

* * * * *